United States Patent
Ehrenberger et al.

(10) Patent No.: US 6,488,325 B1
(45) Date of Patent: Dec. 3, 2002

(54) LUGGAGE COMPARTMENT COVER FOR A VEHICLE

(75) Inventors: Marina Ehrenberger, Esslingen (DE); Werner P. Schlecht, Vaihingen/Enz-Aurich (DE); Holger Seel, Aidlingen (DE)

(73) Assignee: Bos GmbH & Co. KG, Aichwald/Aichschiess (DE)

( * ) Notice: Subject to any disclaimer, the term of this patent is extended or adjusted under 35 U.S.C. 154(b) by 0 days.

(21) Appl. No.: 09/807,781

(22) PCT Filed: Aug. 23, 2000

(86) PCT No.: PCT/EP00/08215

§ 371 (c)(1),
(2), (4) Date: Jul. 27, 2001

(87) PCT Pub. No.: WO01/15938

PCT Pub. Date: Mar. 8, 2001

(30) Foreign Application Priority Data

Aug. 27, 1999 (DE) ......................... 199 40 602

(51) Int. Cl.[7] .............................................. B60R 5/04
(52) U.S. Cl. .................................................. 296/37.16
(58) Field of Search ........................ 296/37.16, 98, 296/136; 160/294, 293.1, 290.1, 305; 280/749, 748

(56) References Cited

U.S. PATENT DOCUMENTS

| 5,224,748 A | * | 7/1993 | Decker et al. | ........... 296/37.16 |
| 5,551,726 A | * | 9/1996 | Ament | ................... 296/24.1 X |
| 5,676,415 A | * | 10/1997 | Ament et al. | ............. 296/37.16 |
| 5,727,836 A | * | 3/1998 | Hosoya | .................... 296/37.16 |
| 5,772,370 A | | 6/1998 | Moore | ........................ 410/100 |
| 6,125,908 A | * | 10/2000 | Ament et al. | ........ 296/37.16 X |

FOREIGN PATENT DOCUMENTS

| DE | 39 38 776 C1 | 6/1991 | ........... B62D/31/00 |
| DE | 40 10 209 A1 | 10/1991 | ............. B60P/7/06 |
| DE | 40 40 038 A1 | 6/1992 | ............. B60R/5/04 |
| DE | 43 36 380 A1 | 4/1995 | ............ B60R/21/06 |
| DE | 197 09 537 C1 | 11/1998 | ............ B60R/21/06 |
| DE | 197 28 587 C1 | 11/1998 | ............ B60R/21/06 |
| FR | 2 694 732 A1 | 2/1994 | ............. B60R/5/04 |

* cited by examiner

Primary Examiner—Joseph D. Pape
(74) Attorney, Agent, or Firm—Greenberg Traurig, P.C.

(57) ABSTRACT

A cargo space cover for a motor vehicle, in which the cover includes a flexible flat sheet that is provided with two extended securing elements coaxial to each other and facing opposite sides located on the forward end with respect to the extraction direction that may be fitted into two receptacles affixed to the vehicle when the cover is in an extended position. The securing elements are connected by means of a longitudinally-extending tensioning medium, and the securing elements and the vehicle-mounted receptacles include matching securing sections that form an interlocking restraint of the flat sheet when in an extended position.

5 Claims, 3 Drawing Sheets

LUGGAGE COMPARTMENT COVER FOR A VEHICLE

BACKGROUND OF THE INVENTION

The invention relates to a cargo space cover for a motor vehicle with a flexible flat sheet that may be extracted from an initial stored position into a horizontal covering position that is provided with two extended securing elements coaxial to each other and facing opposite sides located on the forward end with respect to the extraction direction that may be fitted into two receptacles affixed to the vehicle when the cover is extended.

Such a cargo space cover is generally known for station wagons. A rotatable roller shaft is mounted within a cassette housing attached to the area of the back of the rear seat. The roller shaft contains a flexible flat sheet in the form of a cover that may be extended and retracted. The backside of the cover's front area extends from the cassette housing. Onto this front area, a stiff shaped part is attached from which two securing plugs at the same height as the opposing sides extend outwards to the sides. The securing plugs may be hung in receptacles attached to the vehicle near the vehicle body D-columns when the cover is extended. When the cover is attached, it is stretched approximately horizontal over the cargo space at approximately the height of the vehicle body panel.

The task of the invention is to provide a cargo space cover of the type mentioned at the outset that allows reliable securing of cargo located beneath the cover in the event of a vehicle crash.

This task is solved by the fact that the securing elements are connected together by means of a tensioning medium extended longitudinally, and that the securing elements and the vehicle fixed receptacles include corresponding securing sections that form an interlocking restraint—seen in the tensioning direction of tensioning medium—for the flat sheet when it is extended. The solution according to the invention is based on the recognition of the fact that known cargo space covers offer no protection of cargo in the event of a crash. During certain types of impact, the cargo located in the cargo space may be thrown upward, whereby the flexible flat sheet is bowed upward, along with any shaped portions of it. Thus, the securing plugs slide out of their receptacles, releasing the flat sheet. The solution according to the invention reliably prevents release of the securing elements from the vehicle-mounted receptacles. Since the securing elements are connected together via a tensioning medium extended longitudinally, preferably a rigid hollow profile piece, release of the securing elements from the receptacles is prevented. This provides positive restraint in the event of a vehicle impact for cargo below the flat sheet when it is extended.

Using vertically-stretched nets to separate the cargo area from the passenger compartment of a station wagon, it is known (DE 43 36 380 C2) to provide an extender rod on the front end of the separating net that includes securing elements on opposing sides that may be hung in receptacles attached to the vehicle. These securing elements include mushroom-shaped heads that form an interlocking fastening in the vehicle-mounted receptacles. The invention is based on considerations that tested the applicability of such a solution of the problem facing the invention. Based on these considerations, and taking the various applications into account to include the positioning of the separating net on the one hand and a cargo space cover on the other hand, the conclusion was reached that such a known solution may be applied to the solution offered by the invention.

SUMMARY OF THE INVENTION

In one embodiment of the invention, each of the securing elements is connected with the tensioning medium via an energy-absorbing deformation device. This allows avoidance of peak loads caused by sliding cargo during a vehicle crash that may affect the cargo space cover. Also, energy from the cargo thrown upward is absorbed by the cargo space cover and is converted into deformation energy in the area of the securing elements and the tensioning medium by means of the deformation device.

In a further embodiment of the invention, the tensioning medium is formed as a hollow profile that extends along the entire width of the flat sheet. Energy-absorbing deformation devices are integrated into the hollow profile. This allows a space-saving configuration of the deformation devices. The full-length hollow profile is preferably made of metal, particularly of steel or aluminum.

In a further embodiment of the invention, the securing sections of the securing elements are formed as mushroom-shaped heads, each of which is connected via a shaft with the energy-absorbing deformation device and the hollow profile. In a further embodiment of the invention, the securing sections of the receptacles attached to the vehicle are formed with a lead-in ramp with an undercut connected in the installation direction and acting in the direction of the tension that is matched to the mushroom-shaped head of each securing element. Thus, a very simple and reliable securing of the extended flat sheet is achieved.

Further advantages and characteristics of the invention may be taken from the claims and from the following descriptions of an advantageous embodiment of the invention as shown in the Figures.

DETAILED DESCRIPTION OF THE DRAWINGS

Figure 1:
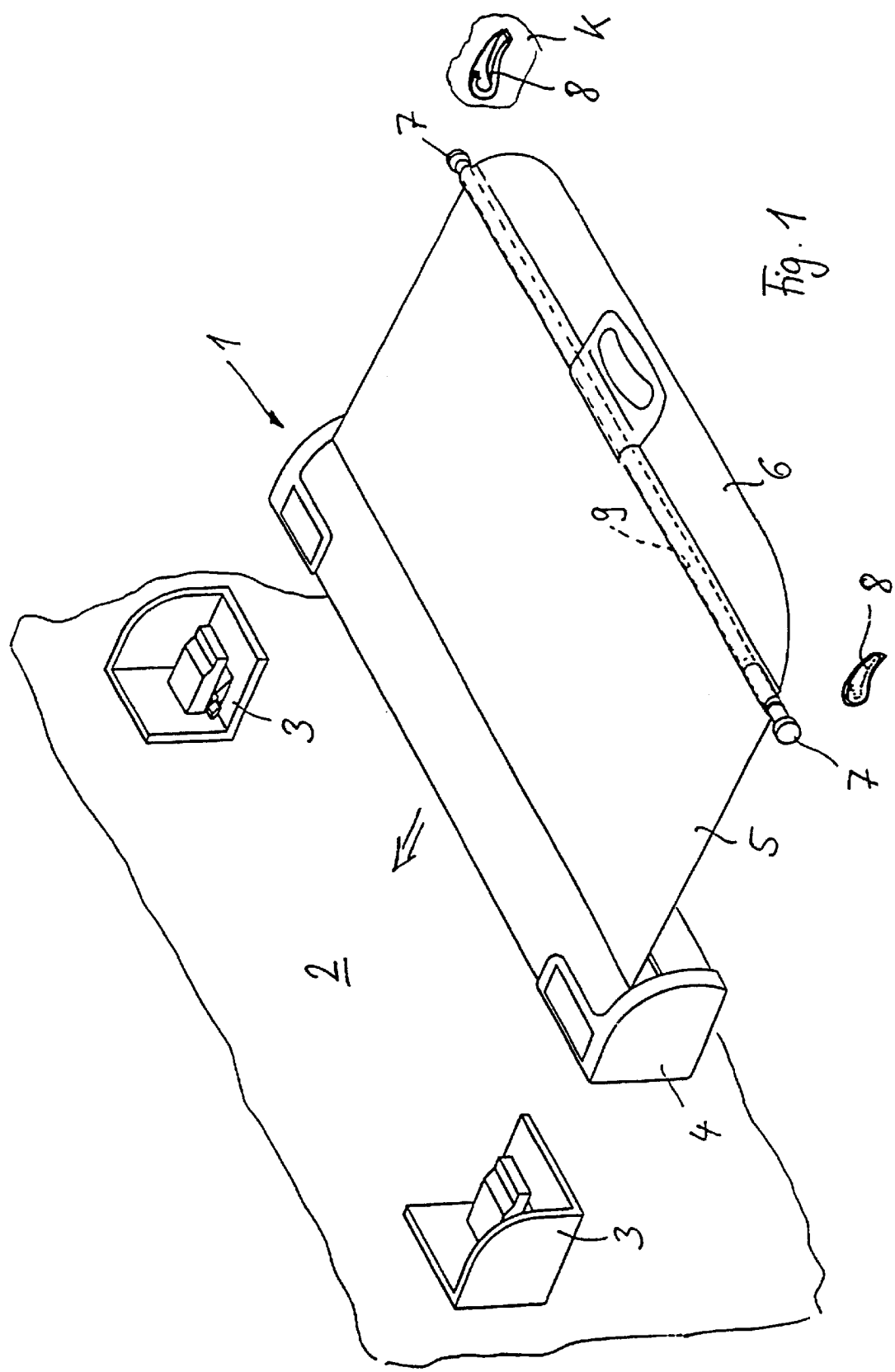
FIG. 1 shows an exploded perspective view of an embodiment of a cargo space cover according to the invention.

At least one mainly stiff shaped piece 6 is provided in the front area of the covering sheet 5 that extends across the entire width of the covering sheet 5 that extends across the entire width of the covering sheet 5. The shaped piece 6 includes a hollow profile 9 that also extends across the entire width of the covering sheet 6 that is integrated into a matching pocket between the covering sheet 5 and shaped piece 6. The shaped piece 6 is also covered with the material of the covering sheet 5, so that the covering sheet 5, the hollow profile 9, and the shaped piece 6 are combined into a single component.

Two securing elements 7 are coaxially positioned to the hollow profile 9 extending perpendicular to the extraction direction of the covering sheet 5 in the area of the opposing front ends. These securing elements 7 may be hung in the vehicle-mounted receptacles 8. For this, each securing element 7 includes a mushroom-shaped head that may be inserted via a corresponding lead-in ramp into a pocket-shaped end area of each vehicle-mounted receptacle 8 by pulling from the rear toward the direction of vehicle travel. The pocket-shaped end area forms a rear-facing slot for the corresponding mushroom-shaped head of the securing element 7 in that a matching, arc-shaped moving crosspiece grips the mushroom-shaped head 7 at the pocket-shaped end area. The vehicle-mounted receptacle 8 is open from the top in the area of the lead-in ramp, so that a large area exists for insertion of the mushroom-shaped head 7.

Each vehicle-mounted receptacle 8 is mounted to a panel covering the D-column of the vehicle body K.

Figure 2:
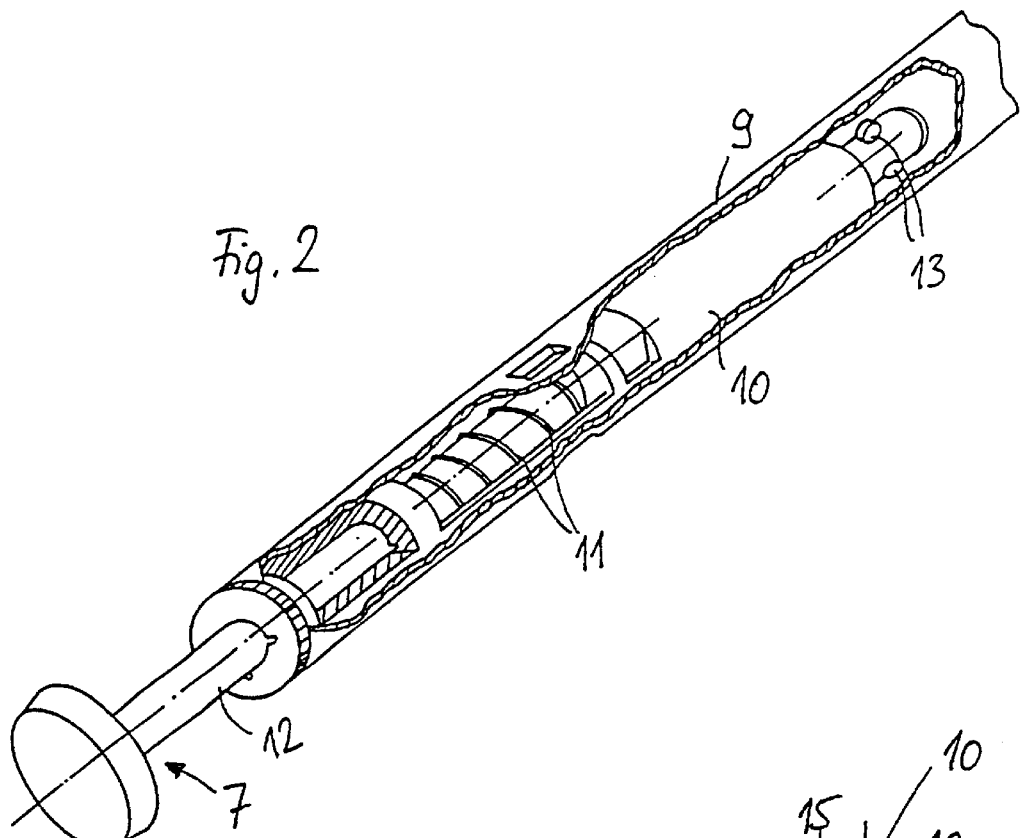
FIG. 2 shows in magnified, partially cut-away perspective view a portion of a securing profile of the front area of the flat sheet as in FIG. 1 in the area of the connection between a securing element and a deformation device.
Figure 3:
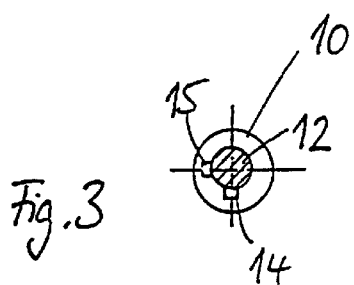
FIG. 3 shows a cross-section through the securing element as in FIG. 2, along the perspective line III—III in FIG. 4.
Figure 4:
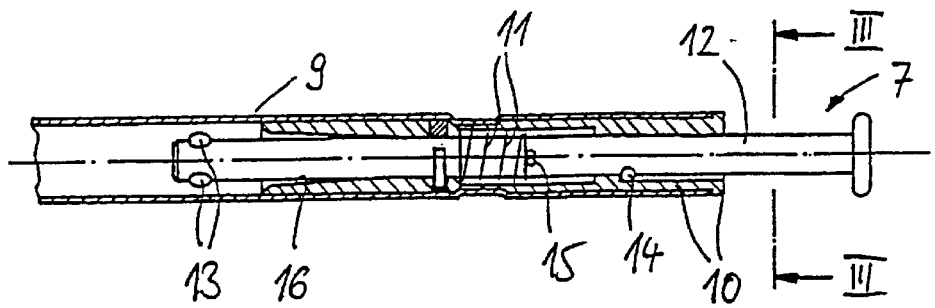
FIG. 4 shows a longitudinal cross-section through the securing profile including a securing element as in FIG. 2.
Figure 5:
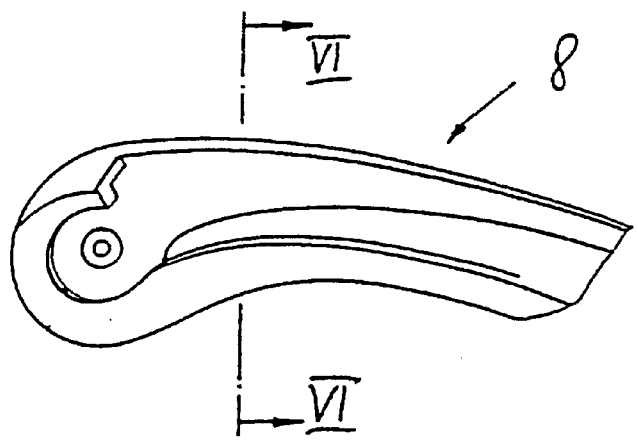
FIG. 5 shows a magnified, perspective view of a vehicle-mounted receptacle for a corresponding securing element for the flat sheet as in FIG. 1.
Figure 6:
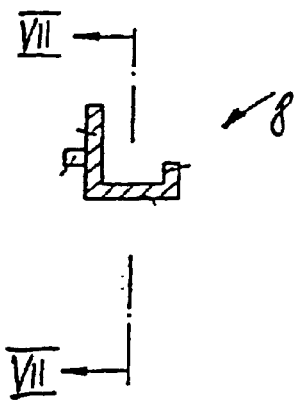
FIG. 6 shows a cross-section through a vehicle-mounted receptacle as in FIG. 5 along a perspective line VI—VI in FIG. 5.
Figure 7:
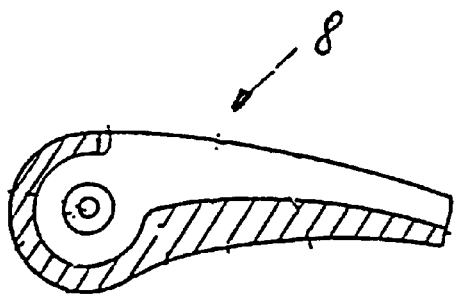
FIG. 7 shows a longitudinal cross-section through a vehicle-mounted receptacle as in FIGS. 5 and 6 along a perspective line VII—VII in FIG. 6.

As may be seen from FIGS. 2 to 4, the mushroom-shaped head 7 of each securing element 7 is positioned on a cylindrical shaft 12 at the front side that slides into the hollow profile 9. The shaft 12 is supported in a hollow cylindrical insert 10 so that it may move longitudinally, whereby the hollow cylindrical insert 10 is inserted from the front into the hollow profile 9, and is held in place by matching crimps that interlock with it. At the front, the insert 10 has a ringed shoulder that is supported by the surrounding front edge of the hollow profile 9. The shaft 12 includes a pressed guide spar 14 that is inserted into a longitudinal slot in the insert 10, which prevents the shaft 12 from rotating. An additional impression 15 on the shaft 12 serves to support a spring 11. An inner end section of the insert 10 includes a conical interior wall structure 16 with which the impressions 13 are arranged on the inner front area of the shaft 12. This results in an energy-absorbing deformation device that is coaxial to the longitudinal axis of the hollow profile 9, thus operating in the tensioning direction of the securing elements 7. The design and arrangement of these energy-absorbing deformation devices with respect to a securing element shaft is identical to the energy-absorbing deformation device for a lateral securing element of the separating net in accordance with DE 43 36 380 C2, so that one is referred to this patent for further details of this energy-absorbing deformation device. This creates a force limiter for the receptacle of the flat sheet with its securing elements 7 in the area of the vehicle-mounted receptacles 8.

What is claimed is:

1. A cargo space cover for a motor vehicle, the cover having a flexible flat sheet that may be extracted from an initial stored position into a horizontal covering position, the cover being provided with two securing elements being disposed coaxially to one another at opposite ends of a transversely extending axis, and facing outwardly with respect thereto, the two securing elements being configured to be positioned into two respective receptacles affixed to the vehicle, when the cover has been extracted, characterized in that the securing elements (7) are connected with each other via a tensioning medium (9) that is disposed axially between the securing elements, so that the tensioning medium exerts a pulling force on the securing elements, toward one another, when the securing elements are received by the receptacles, and that the securing elements (7) and the vehicle fixed receptacles (8), which receptacles include securing sections configured to cooperate with the securing elements, are cooperatively configured to form an interlocking restraint preventing the securing elements from moving toward one another when they are received by the receptacles, toward preventing undesired disengagement of the securing elements (7) from the vehicle fixed receptacles (8).

2. A cargo space cover according to claim 1, characterized in that the securing elements (7) are connected with the tensioning medium (9) via an energy-absorbing deformation device (10 to 16).

3. A cargo space cover according to claim 1, characterized in that the tensioning medium is represented by a hollow profile (9) that extends across the entire width of the flat sheet (5) and into which the energy-absorbing deformation devices (11 to 16) are integrated.

4. A cargo space cover according to claim 1, characterized in that the securing sections of the securing elements (7) are formed as mushroom-shaped heads that are connected with the energy-absorbing deformation devices (11 to 16) and with the hollow profile (9) via a shaft (12).

5. A cargo space cover according to claim 4, characterized in that each of the securing sections of the vehicle-mounted receptacles (8) is formed as a lead-in ramp including a rear-facing slot connected along the mounting direction and acting in the direction of tension that matches the mushroom-shaped head of the securing element (7).

* * * * *